No. 716,881. Patented Dec. 30, 1902.
I. J. FOCCART.
SPEED CHANGING APPARATUS.
(Application filed July 17, 1902.)

(No Model.) 2 Sheets—Sheet 1.

No. 716,881. Patented Dec. 30, 1902.
I. J. FOCCART.
SPEED CHANGING APPARATUS.
(Application filed July 17, 1902.)

(No Model.) 2 Sheets—Sheet 2.

UNITED STATES PATENT OFFICE.

IGNACE JOSEPH FOCCART, OF PARIS, FRANCE.

SPEED-CHANGING APPARATUS.

SPECIFICATION forming part of Letters Patent No. 716,881, dated December 30, 1902.

Application filed July 17, 1902. Serial No. 115,931. (No model.)

*To all whom it may concern:*

Be it known that I, IGNACE JOSEPH FOCCART, a citizen of the French Republic, residing at Paris, France, have invented certain new and useful Improvements in Speed-Changing Apparatus, of which the following is a specification.

My invention has for its object a speed-changing mechanism applicable in a general way to all machines, apparatus, mechanisms, transmissions of power, &c., in which a driving member actuates at a variable speed a controlled or receiving member.

My speed-changer is more particularly adapted for automobile vehicles. It is of the class of those in which the change from one speed to another between predetermined highest and lowest limits is made progressively and insensibly.

In the annexed drawings I have shown by way of example a speed-changer embodying my invention.

Figure 1:
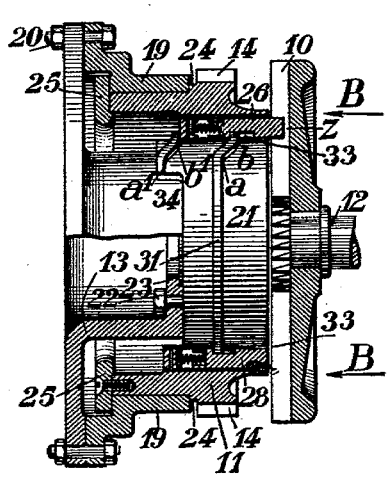
Figure 4:
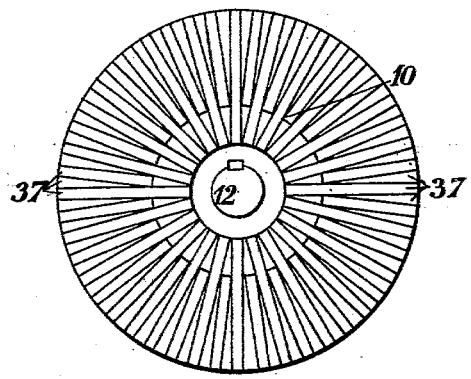
Figure 5:
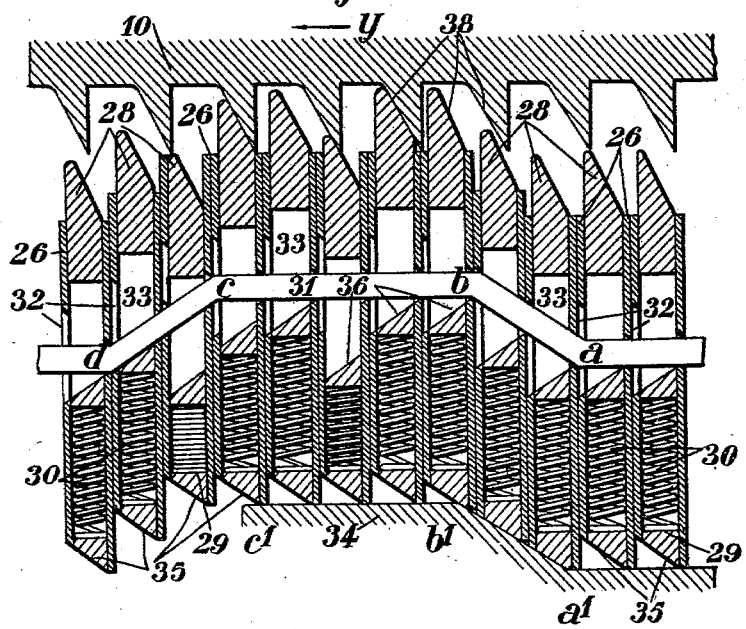
Figure 2:
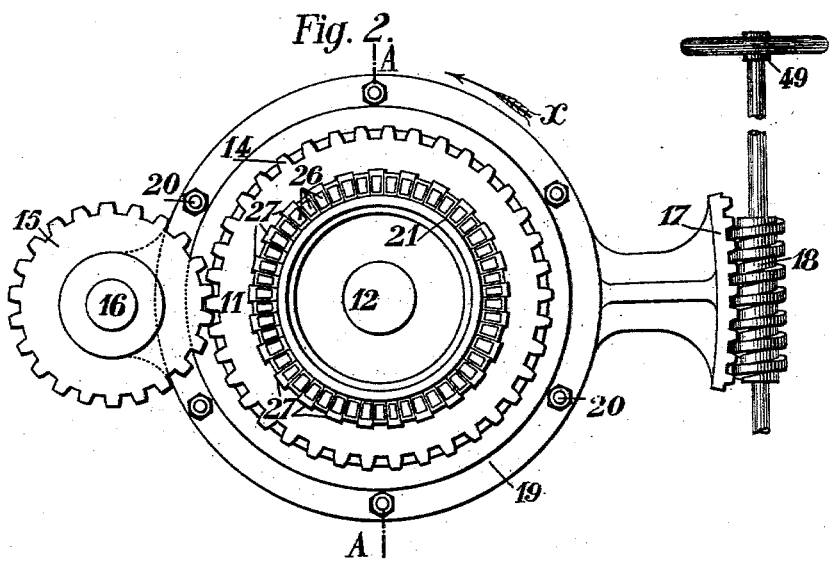
Figure 3:
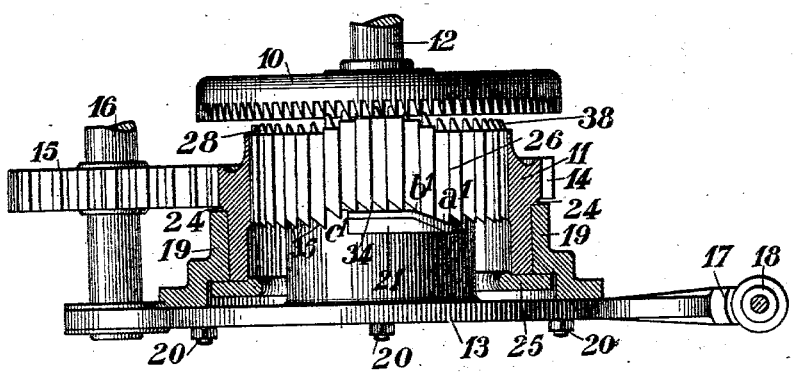

Figure 1 is a longitudinal section of the mechanism on the line A A of Fig. 2. Fig. 2 is a face view, according to the arrows B B of Fig. 1, the plate being supposed to be removed. Fig. 3 is a vertical section of Fig. 2. Fig. 4 is a face view of the grooved plate; and Fig. 5 is a detail, on a large scale, showing the operation of the movable teeth and connecting members.

My progressive speed-changing mechanism comprises two principal members—a plate 10, having radial grooves, and a ring 11, having movable teeth capable of engaging the grooves of the plate. The plate 10 is keyed or otherwise fixed or wedged on the shaft 12. The ring 11 is mounted in a movable support 13, so as to be able to be displaced before the fixed plate 10. In displacing the ring with relation to the plate the movable teeth of the ring may engage in the radial grooves of the plate at points more or less near the periphery or the center of the plate, according as the ring is more or less eccentric with relation to the plate.

In order to fix the ideas, let us suppose the speed-changer applied to an automobile. We will also suppose that the plate 10 is the driver and the ring 11 receiver or driven member. The shaft 12 of the plate receives movement either directly or indirectly from the motor. It transmits it through the plate 10 to the ring 11, which will turn, as I will explain farther on, at a greater or less speed, according to its position. The ring is supposed to gear by a second peripheral set of teeth 14 with a pinion 15, keyed on the shaft 16, which actuates the wheels of the vehicle. The ring 11 is mounted, as I have said, in a movable support 13, which acts as a bearing, in which it may freely turn. This support 13 is mounted on the shaft 16, carrying the receiving-pinion 15, in such a way as to be able to oscillate around its axis. At the opposite extremity the support is in the form of the toothed sector 17. The teeth 17 gear with an endless screw 18, which the conductor may operate by means of a hand-wheel 49, for example. By turning the endless screw 18 in one direction or the other the support 13 will oscillate around the axis 16 in a corresponding direction, drawing with it the ring 11, which will thus be displaced in front of the plate and will take a concentric position or more or less eccentric with relation to the latter at the will of the operator.

It will be understood that the oscillation of the support 13 around its axis 16 might be effected by any suitable device other than an endless screw gearing with a sector.

Instead of being connected by the gears 14 and 15 the ring 11 and shaft 16 may be connected by a belt, a cable, a chain, &c., passing over pulleys, wheels, &c., and the support 13 preserves its axis of oscillation at 16—that is to say, on the receiving-axis.

The crown or ring 11 turns freely in the oscillating support 13, which acts as a bearing therefor, it being shown as provided with an exterior ring 19, cast with or fixed to the support, for example, by means of bolts 20, and with a socket or internal sleeve 21, bolted at 22 to a flange 23 of the support.

The ring 11 is prevented from sliding axially in its support by means of a circular shoulder 24 and of a take-up ring 25, forming a collar, so that the exterior ring 19, entering into the circular groove formed by these shoulders or collars, guides the ring 11 and does not allow it to either advance or retire, but only to turn.

The circular internal face of the ring 11 is provided all around with a series of prismatic juxtaposed pieces 26, constituting the tooth-carriers. In the internal face of the ring 11 notches 27 are made at suitable intervals, and the tooth-carriers 26 are alternately higher or lower and of such dimensions that every second tooth-carrier engages a corresponding notch 27, thus insuring the advance of all the tooth-carriers with the ring 11, while the ring formed by the whole of the tooth-carriers presents an internal surface which is cylindrical, smooth, in contact with the peripheral external surface of the sleeve 21, in one piece with the support 13. This sleeve thus serves as an internal bearing for the ring 11 and tooth-carriers, which it guides and maintains in place.

Each tooth-carrier 26 is hollow and contains a movable tooth 28. The tooth-carrier constitutes a sort of cylinder in which the tooth may play in the manner of a piston. Between the bottom 29 of the tooth-carrier and the tooth 28 is interposed a spring 30, which tends to constantly force out the tooth from the tooth-carrier.

The tooth-carriers, on account of the construction which I have just explained, are obliged to turn all together with the ring 11 when the latter turns in its support. Simultaneously they may each and all advance and retire axially in such a way that according to their position the corresponding teeth engage or not with the radial grooves of the plate 10. It is therefore important, as will be seen later, that the teeth of the ring 11 only engage with the radial grooves of the plate 10 on a slight fraction of the circumference—that is to say, in the example shown in the drawings for a length about four or five adjacent teeth at the most. It is also important that this gearing takes place on an arc fixed with relation to the support 13. In other words, it is necessary that each tooth at each revolution remains out of action—that is to say, disengaged from the plate—and that each successive tooth only moves out at the moment when it approaches the fixed point about which the engaging operation should take place, to immediately return to place when it has passed the proper portion of the arc. It is necessary also that this moving in and out of the teeth should be automatic. To do this, the sleeve 21 is provided on its exterior peripheral face with a circular tongue 31, forming a cam, engaging a corresponding groove 32 of the tooth-carriers 26 and a groove 33 of the teeth 28. In this way the tooth-carriers, guided by the fixed cam 31, will move out and in in their revolving movement around the sleeve 21, according to the profile of that cam. Thus in following a tooth-carrier in a revolution around the sleeve it will at first remain completely in its normal position and will only project when it reaches the incline $a\ b$, will remain completely projected the length of the portion $b\ c$ of the cam, and will return to normal position the length of $c\ d$, to remain thus from $d$ until it returns to $a$.

Each following tooth-carrier will execute the same movement and will project completely only while traveling along the portion $b\ c$ of the cam, Fig. 5. There will therefore never be more than five adjacent teeth at the most at one time which can gear with the grooves of the plate and that always at a fixed point of the circumference. A second cam 34, parallel to the first, but which can only be used in the portion $a'\ b'$, Fig. 5, parallel to the incline $a\ b$, and the portion $c'\ d'$, parallel to $c\ d$, facilitates the moving in and out of the tooth-carriers and prevents too-rapid wear.

Supposing that the ring 11 and the tooth-carriers turn in the direction of the arrow $x$ around the sleeve 21, the bottom of the tooth-carriers is beveled at 35, following the angle of the incline $a'\ b'$ of the cam 34. When a tooth-carrier reaches $a'$, it bears on the whole surface 35 on the incline $a'\ b'$, which thus causes the tooth-carrier to advance, and consequently the tooth, which then engages with the plate. When a tooth-carrier, with its tooth, reaches $c$, the lower wall of the groove 33, which is beveled at 36, following the angle of the incline $c\ d$, bears the length of 36 against the incline $c\ d$, which causes the tooth to move in, and consequently the tooth-carrier, disengaging it from the plate 10.

The radial arrangement of the grooves 37, Fig. 4, of the plate 10 implies that the pitch of the teeth 28 and that of the grooves 37 cannot be the same everywhere and that consequently the teeth cannot engage exactly with the grooves from one end to the other of the length when their tooth-carriers are completely moved out, as from $b$ to $c$, Fig. 5. It is for this only reason that the part 36 is not absolutely in one piece with the part 28. By allowing the tooth 28 to play in the tooth-carrier 26 with the interposition of the spring 30, as has been explained above, the tooth may advance or retire elastically, so as to accommodate itself to the relative position of the grooves of the plate 10. In all cases the breakage of the parts, which would be inevitable without that, is thus prevented at the same time that it is possible to have several teeth engaged in the grooves of the plate, whatever may be the position, more or less eccentric, of the ring 11 with relation to the plate 10.

In order to have the greatest contact-surface possible between the teeth and the grooves, the two are beveled, as shown in Figs. 3 and 5 at 38.

From the foregoing the general operation of the mechanism will be readily understood.

Suppose that the driving-plate 10 turns in the direction of the arrow $y$, Fig. 5, and that the ring 11 occupies the position indicated in the drawings, it will turn in its support 13 with the linear speed equal to that of the linear speed of the point $z$, Fig. 1, of the plate where the engagement of the teeth 28 with the grooves 37 takes place. So long as the support 13 is not caused to oscillate this speed will remain the same, the teeth 28 always projecting at the same fixed point $z$ of the space in spite of the rotation of the parts 10 and 11, because the sleeve 21, which produces the projection of the teeth, remains fixed. If now the support 13 is caused to oscillate around its axis, so as to move the ring 11 more or less eccentrically with relation to the plate 10, the point of engagement $z$ will progressively move farther away from or approach nearer to the center of the plate 10 and progressively and insensibly increase or diminish its linear speed, so that the ring will also turn progressively at an increasing or decreasing angular speed. As soon as the movement of the support 13 ceases the speed of the ring will remain fixed. One can then by moving the ring in front of the plate insensibly pass from one speed to another, from the maximum to the minimum and inversely, as well as stop at any intermediate speed at will.

It is clear that the mechanism which I have just described may vary in the details of its construction without exceeding the limits of my invention. These details will vary according to the particular applications of the device. It is also immaterial whether it is the plate 10 or the ring 11 which is the driver or receiver, directly or indirectly, with straight or conical gears, by pulleys or belts, chains, cables, or any other means of transmission. The displacement of the support of the ring with relation to the plate might just as well operate otherwise than by oscillation around a fixed point. In certain cases this movement might, for example, be rectilinear, the support being displaced parallel to itself in front of the plate.

What I claim is—

1. A mechanism for progressively changing speed, consisting of a rotative plate of fixed position, provided with radial grooves in its face, a movable support, and a rotative ring placed in front of the plate and mounted in said movable support, so as to be able to move the ring more or less eccentrically with relation to the plate; the ring being provided with teeth, movable axially, in such a way as to engage and disengage with the grooves of the plate, substantially as described.

2. A mechanism for progressively changing speed, consisting of a rotative plate of fixed position, provided with radial grooves in its face, a movable support, and a rotative ring placed in front of the plate and mounted in said movable support, so as to be able to move the ring more or less eccentrically with relation to the plate; the ring being provided with teeth, movable axially, in such a way as to engage and disengage with the grooves of the plate, and the support being provided with a guide member for moving the teeth axially, substantially as described.

3. A mechanism for progressively changing speed, consisting of a rotative plate of fixed position, provided with radial grooves in its face, a movable support, and a rotative ring placed in front of the plate and mounted in said movable support, so as to be able to move the ring more or less eccentrically with relation to the plate; the ring being provided with teeth, movable axially, in such a way as to engage and disengage with the grooves of the plate, and the support being provided with a guide member to cause the teeth to remain disengaged from the plate except at a fixed point of its circumference, substantially as described.

4. A mechanism for progressively changing speed, consisting of a rotative plate of fixed position provided with radial grooves in its face, a rotative ring in front of the plate, a receiving-shaft, a movable support for the rotative ring adapted to move with relation to the receiving-shaft, the ring being provided with teeth movable axially; means for causing the teeth to engage and disengage the grooves of the plate, and connections between said shaft and ring, substantially as described.

5. A mechanism for progressively changing speed, consisting of a rotative plate of fixed position, provided with radial grooves on its face, a receiving-shaft of fixed position, a movable support connected to the receiving-shaft and capable of oscillating with relation thereto, a rotative ring mounted on said movable support and provided with axially-moving teeth, means for moving said teeth to engage and disengage with the rotative plate, and connections between the said shaft and ring, substantially as described.

6. A mechanism for progressively changing speed, consisting of a rotative plate of fixed position, provided with radial grooves, a receiving-shaft of fixed position, an oscillating support connected with said shaft, a rotative ring, connections between said shaft and ring, axially-moving teeth mounted in said ring, and cams for moving said teeth into and out of engagement with the rotative plate, substantially as described.

7. A mechanism for progressively changing speed, consisting of a rotative plate provided with radial grooves in its face, a rotative ring placed in front of the plate, a movable support for the ring, the ring being provided with tooth-carriers and teeth moving axially, and means for moving the teeth into and out of engagement with the rotative plate, substantially as described.

8. A mechanism for progressively changing speed, consisting of a rotative plate provided with radial grooves in its face, a rotative ring placed in front of the plate, a movable support for the ring, the ring being provided with tooth-carriers, and teeth yieldingly mounted in said carriers, and means for moving the tooth-carriers so that the teeth will engage and disengage said rotative plate, substantially as described.

9. A mechanism for progressively changing speed, consisting of a rotative plate provided with radial grooves in its face, a rotative ring placed in front of the plate, a movable support for the ring, the ring being provided with tooth-carriers and teeth, the teeth having double extremities, and means for moving the teeth into and out of engagement with the rotative plate, substantially as described.

10. A mechanism for progressively changing speed, consisting of a rotative plate provided with radial grooves in its face, a rotative ring placed in front of the plate, a movable support for the ring, the ring being provided with tooth-carriers, and teeth having recesses in their sides, and a cam for moving the teeth into and out of engagement with the rotative plate, substantially as described.

11. A mechanism for progressively changing speed, consisting of a rotative plate provided with radial grooves in its face, a rotative ring placed in front of the plate, a movable support for the ring, the ring being provided with axially-movable teeth, means for moving the teeth axially, a receiving member connected with the ring, and means for adjusting the ring with relation to the plate so as to gradually increase or decrease the relative speed between the rotative plate and the receiving member, substantially as described.

In testimony whereof I have signed my name to this specification in the presence of two subscribing witnesses.

IGNACE JOSEPH FOCCART.

Witnesses:
CLAUDIUS LUTSON,
EDWARD P. MACLEAN.